(12) United States Patent
Wijning et al.

(10) Patent No.: US 8,376,042 B2
(45) Date of Patent: Feb. 19, 2013

(54) INSTALLING AN EXPANDABLE TUBULAR IN A SUBSEA WELLBORE

(75) Inventors: Diederick Bernardus Wijning, Schiedam (NL); Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 156 days.

(21) Appl. No.: 12/682,211

(22) PCT Filed: Oct. 3, 2008

(86) PCT No.: PCT/NL2008/000214
§ 371 (c)(1),
(2), (4) Date: Aug. 12, 2010

(87) PCT Pub. No.: WO2009/048319
PCT Pub. Date: Apr. 16, 2009

(65) Prior Publication Data
US 2010/0300697 A1 Dec. 2, 2010

Related U.S. Application Data

(60) Provisional application No. 60/690,703, filed on Oct. 10, 2007.

(51) Int. Cl.
*E21B 19/00* (2006.01)
(52) U.S. Cl. ............... 166/85.5; 166/77.2; 166/77.1; 166/85.1
(58) Field of Classification Search ............ 166/353, 166/351, 355; 414/22.15–22.71
See application file for complete search history.

(56) References Cited

U.S. PATENT DOCUMENTS
2,548,616 A * 4/1951 Priestman et al. ........... 175/103
(Continued)

FOREIGN PATENT DOCUMENTS
WO WO 01/33028 A 5/2001
(Continued)

*Primary Examiner* — Thomas Beach
*Assistant Examiner* — Aaron Lembo
(74) *Attorney, Agent, or Firm* — Birch, Stewart, Kolasch & Birch, LLP (57) ABSTRACT

A method and vessel for installing an expandable tubular in a subsea wellbore, wherein said expandable tubular is assembled from expandable tubular segments, said expandable tubular being adapted to be expanded diametrically when positioned in said wellbore by means of expansion tooling, wherein a multitude of expandable tubular segments are provided, and
wherein use is made of a surface vessel, said vessel comprising:
at least one assembly station adapted for the assembly of at least one intermediate tubular assembly by interconnection of multiple expandable tubular segments,
an intermediate tubular assembly suspension storage device adapted for storage of one or more intermediate tubular assemblies, said intermediate tubular assemblies being suspended from the vessel into the water by said storage device,
a guide and handling system for intermediate tubular assemblies, said guide and handling system having an entry and an exit, said entry being spaced from said exit, the entry being arranged and adapted to receive a suspended intermediate tubular assembly from the storage device, the system being adapted for the upward feeding of said intermediate tubular assembly from the entry towards a top of the system, and then downwards to the exit, said system further being adapted for launching the intermediate tubular assembly downward from said exit into the water towards and into the wellbore,
a connecting station adapted for connecting an intermediate tubular assembly to another intermediate tubular assembly.

21 Claims, 4 Drawing Sheets

U.S. PATENT DOCUMENTS

| | | | |
|---|---|---|---|
| 3,116,781 A * | 1/1964 | Woolley et al. | 72/160 |
| 3,559,905 A * | 2/1971 | Palynchuk | 242/390.5 |
| 3,667,554 A * | 6/1972 | Smitherman | 175/57 |
| 3,677,345 A | 7/1972 | Sizer | |
| 3,777,827 A * | 12/1973 | Thiery et al. | 175/103 |
| 4,044,895 A * | 8/1977 | Adair | 414/22.63 |
| 4,730,677 A * | 3/1988 | Pearce et al. | 166/345 |
| 5,547,314 A | 8/1996 | Ames | |
| 6,250,395 B1 * | 6/2001 | Torres | 166/382 |
| 6,508,311 B1 | 1/2003 | Torres | |
| 6,745,840 B2 * | 6/2004 | Headworth | 166/346 |
| 6,766,860 B2 * | 7/2004 | Archibald et al. | 166/341 |
| 6,871,609 B2 * | 3/2005 | Roodenburg et al. | 114/201 R |
| 6,973,979 B2 * | 12/2005 | Carriere et al. | 175/203 |
| 7,225,879 B2 | 6/2007 | Wylie et al. | |
| 7,226,244 B1 * | 6/2007 | De Groot et al. | 405/168.4 |
| 7,584,796 B2 * | 9/2009 | Ayling | 166/358 |
| 7,806,628 B2 * | 10/2010 | Willis | 405/166 |
| 7,814,992 B2 * | 10/2010 | Olsen | 175/85 |
| 2003/0098150 A1 * | 5/2003 | Andreychuk | 166/77.2 |

FOREIGN PATENT DOCUMENTS

| | | |
|---|---|---|
| WO | WO 02/18742 A1 | 3/2002 |
| WO | WO 2004/020275 A2 | 3/2004 |
| WO | WO 2004/079149 A2 | 9/2004 |

* cited by examiner

INSTALLING AN EXPANDABLE TUBULAR IN A SUBSEA WELLBORE

This application is the National Phase of PCT/NL2008/000214 filed on Oct. 3, 2008, which claims priority under 35 U.S.C. 119(e) to U.S. Provisional Application No. 60/960,703 filed on Oct. 10, 2007, all of which are hereby expressly incorporated by reference into the present application.

The present invention relates to a method for installing an expandable tubular in a subsea wellbore. The invention further relates to a surface vessel for use in such a method.

Expandable tubular technology is generally based on the development of tubulars (casing as well as liners) and suitable expansion tooling that allow a tubular to be placed in a wellbore and then expanded diametrically so as to obtain a larger diameter. Commonly said tubulars are solid expandable tubulars, i.e. the tubular being a solid metal specialty product.

In broad terms this expandable tubular technology allows to reduce the telescopic effect of casing having a conventional plan. In the field expandable tubular technology is further contemplate for so called slim-wells, as well as monodiameter wells.

Information on this technology as well as advantages over the conventional technology is e.g. presented in U.S. Pat. No. 7,225,879, articles such as "The development and applications of solid expandable tubular technology", by G. Noel, Journal of Canadian Petroleum Technology, December 2005, volume 44, no 12, and on the internet, e.g. at www.enventuregt.com. of Enventure Global Technology Inc.

One installation approach is to assemble the expandable tubular from expandable tubular segments, e.g. having a length of 40 foot. The segments often are provided at their ends with screwthread couplings to allow interconnection. Also welding of the segments has been proposed. The segments interconnected in vertical position and directly lowered into the sea and then into the wellbore. A drawback of this approach lies in the speed of the installation operation.

In another approach the expandable tubular is spooled on a reel on the vessel and unwound from the reel upon installation. In principle this allows the use of far longer continuous length of expandable tubular, preferably without couplings or welds. Also it allows for faster installation of the expandable tubular in the wellbore.

For expandable tubulars diameters of 11¾ inch, 9⅝ inch, 7⅝ inch and 6 inch are nowadays contemplated. Spooling on a reel of tubulars with such diameters and of the length envisaged for this technology requires very large diameter reels. Placement of such a reel or reels on a drilling vessel is generally impractical. It is noted that space is in general a problem on drilling vessels due to space requirements for the onboard equipment needed for drilling operations. Thus the industry is more or less forced to apply the slower "joining of segments approach" when installing expandable tubulars.

The present invention aims to provide an improved method and vessel for the installation of expandable tubulars in a subsea wellbore.

The present invention in particular aims to provide a method which allows for fast installation of an expanded tubular in order to reduce the overall well completion time. More in particular the present invention aims to provide a method suitable for deepwater subsea wellbores, e.g. in water depths of more than 1000 meters.

The present invention provides a method according to claim 1.

In this method one or more intermediate tubular assemblies are created at the assembly station on the vessel by joining tubular segments, preferably in a vertical orientation, which one or more intermediate tubular assemblies are then stored by suspending them vertically from the vessel.

Preferably the length of an intermediate tubular assembly is at least 100 meters, more preferably at least 300 meters.

The vessel is provided with a guide and handling system for such an intermediate tubular assembly. This guide and handling system has an entry and an exit, wherein the entry is arranged remote from the exit.

The entry is arranged and adapted to receive a suspended intermediate tubular assembly from the storage device and the system is adapted for the upward feeding of said intermediate tubular assembly from the entry towards a top of the system, and then downwards to the exit.

The system is further adapted for launching the intermediate tubular assembly downward from said exit into the water towards and into the wellbore.

By this guide and handling system it is achieved that the trailing end of the intermediate tubular assembly can be held above waterline, thus allowing the efficient connection thereof to the forward end of a succeeding intermediate tubular assembly.

The interconnection of tubular segments can optionally be effected by welding.

The interconnection of the intermediate tubular assemblies is preferably effected by welding but can also be done by a mechanical coupling or otherwise.

The present invention also relates to a vessel for installation of expandable tubulars in a subsea wellbore, preferably the vessel being a drilling vessel with one or more drilling stations and associate drilling equipment for drilling the wellbore.

In a possible embodiment the vessel includes multiple drilling stations, e.g. two drilling station allowing dual activity operations, e.g. drilling of a wellbore and simultaneous lowering of the BOP.

The invention further relates to a guide and handling system for intermediate expandable tubular assemblies, which system can be mounted on a vessel, e.g. a drilling vessel.

The invention further relates to a dual activity drilling vessel having two drilling stations, e.g. under a massive derrick and to the conversion of an existing dual activity drilling vessel to a vessel according to the invention. It will be appreciated that the curved guide structure can be mounted on or in said massive derrick and by provision of a storage device for intermediate expandable tubular assemblies as disclosed herein. Such a vessel can be operated according to the inventive method for installing expandable tubulars in a subsea wellbore. One example is the Discoverer Enterprise of Transocean and its sister ships. This massive, multi-purpose vessel can work in the deepest waters being explored in the world today. It can drill, test and complete wells in water depths of up to 10,000 feet—almost two miles. At 835 feet, the Discoverer Enterprise is almost as long as three U.S. football fields, and it can drill a well more than 6.5 miles beneath its drill floor.

Dual-activity drilling technology vessels in general have the capability to conduct drilling operations simultaneously, rather than sequentially in series. Two full-capability, full-capacity drilling stations—in actuality two separate drilling rigs—carry out these parallel operations, commonly under a single, massive derrick.

Commonly such a dual activity drilling vessel has an automated pipe-handling system which allows for full integration of the two rigs. It will be appreciated that these vessel, as they have two drilling stations above a moonpool, or above two distinct moonpools, as well as a massive derrick, can be converted to a vessel according to the present invention.

Figure 1:
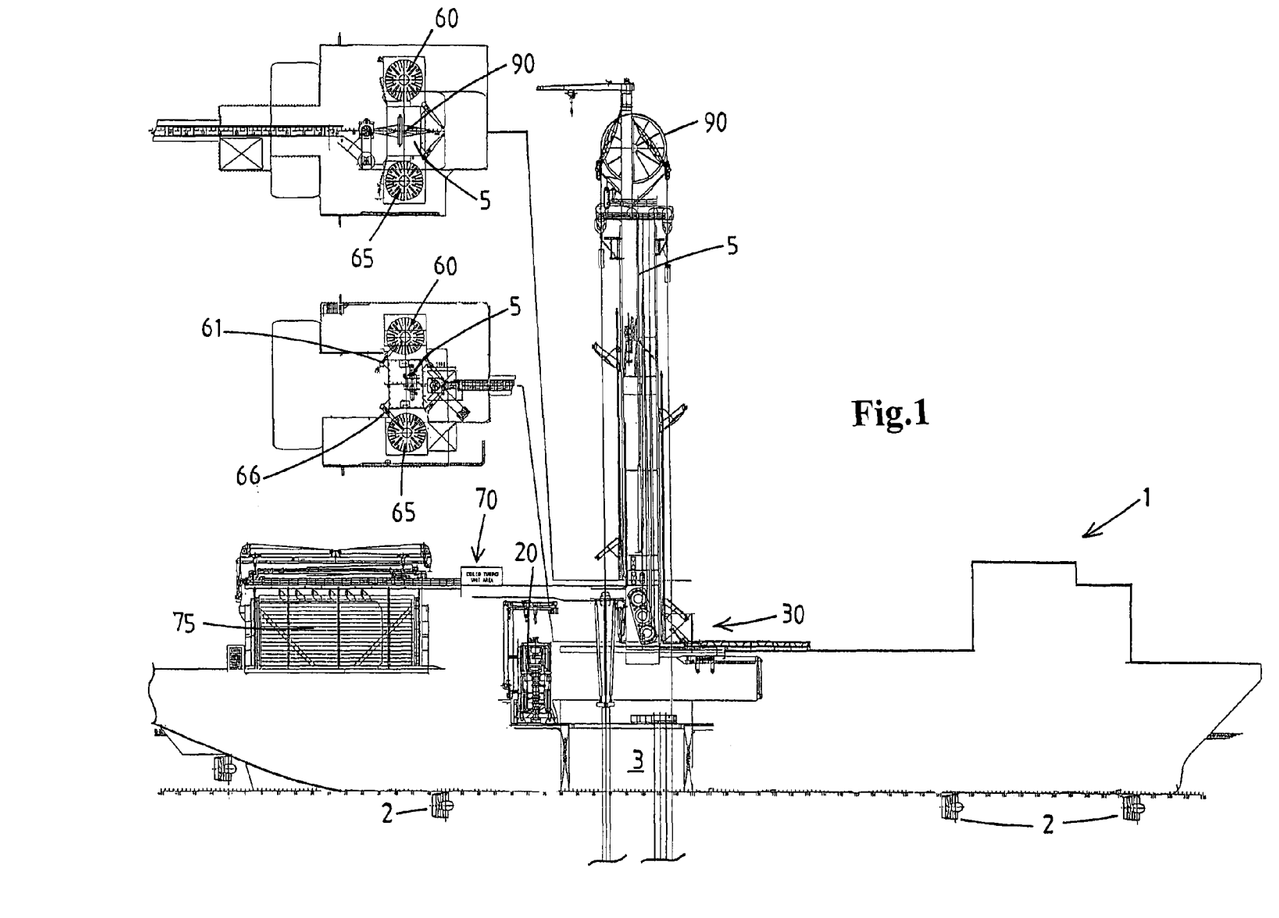
FIG. 1 shows a side cross-sectional view of an example of a vessel according to the invention, and two plan views taken at indicated levels of the guide and handling system.

The invention will now be explained in more detail with reference to the appended drawings. In the drawings:

FIG. 1 shows a vessel 1, in this example a drilling vessel suitable for performing subsea drilling operations including the installation of an expandable tubular in a wellbore. The vessel shown here has no dual-activity capability, but as mentioned above the invention can also be realised on dual-activity drilling vessels.

The vessel 1 here is a monohull vessel. Obviously the vessel could also be of a different type, e.g. a semi-submersible. The vessel could also be a platform, such as a tension leg platform or otherwise.

The exemplary vessel 1 is suitable for deepwater operations and includes a dynamic positioning system and associated thrusters 2 to maintain the vessel in position over a wellbore (or wellbore to be established).

The vessel 1 has a hull provided with a moonpool 3 extending through the hull. In the hull holds are provided for storage of expandable tubular segments and possibly other tubulars associated with drilling activities. Obviously storage of such segments, e.g. having a length of 40 foot, could also be arranged on deck of the vessel.

Adjacent the moonpool 3, here in the vertical projection above the moonpool 3, the vessel 1 is provided with a tower, here embodied as a mast 5.

Although some features of the mast 5 and associated equipment will be elucidated more in detail in the following description referral is made here to public documents describing the Huisman/Itrec's "MPT" or "multipurpose tower". In particular documents WO02/18742 and WO2004/020275 are mentioned here and their content is incorporated herein by reference.

In particular in WO02/18742 it is disclosed that drilling equipment is associated with the mast 5 so that drilling operations can be carried out.

The mast 5 here has the form of a hollow elongated box structure. The box structure is of substantially quadrangular design as is preferred.

The mast 5 is placed such over the moonpool 3 that a first imaginary firing line is present on the forward side of the mast, whereas a second firing line is present on the rear side of the mast 5. As will be appreciated from the remainder of the description these forward and rearward sides are mentioned "entry side" and "exit side" as the same language is used in the claims.

The mast 5 is provided with a first and a second hoisting means; the first hoisting means providing hoisting capability along the first firing line (at the entry side of the mast); the second hoisting means providing hoisting capability along the second firing line (at the exit side of the mast)

Each hoisting means includes a winch, a hoist cable, and a load connector suspended from the cable on the respective side of the mast which can be raised and lowered upon operation of the winch.

As is preferred the winches, here 6a-c, are mounted in the mast 5, preferably at the lower end thereof. The hoist cables 7, 8 extend upwards in the mast 5 to sheave arrangements at or near the top of the mast. The load connectors 9, 10 can have any suitable form, or be interchangable depending on the load to be handled, e.g. the assembly 35 or other load.

For handling of an intermediate tubular assembly 35 it is envisaged to embody each load connector as a clamp which can clamp the assembly on the outside, e.g. similar of design to a hang-off clamp in the field of pipelaying.

In this example, as is preferred, each of said load connectors is associated with a trolley 9, 10 that is guided vertically along the mast 5. For this purpose the respective side of the mast has one or more vertical guide rails. In this example at least the second hoisting means have a capacity that allows to lower and raise a BOP 20.

For the BOP 20 this vessel 1, as is preferred, is equipped with a BOP storage area adjacent the moonpool 3. A BOP carrier is provided that allows to position the BOP 20 in the second firing line for lowering the BOP to the seabed.

At the entry side of the mast provision is made for a station 30. In the wording of the claims of this document the station 30 both is an assembly station and an interconnection station, as this station 30 here serves two tasks namely to assemble at least one intermediate tubular assembly by interconnection of multiple expandable tubular segments and also to interconnect two intermediate assemblies as will be explained below.

In another design of the vessel one could envisage the presence of an assembly station and an interconnection station distinct and remote from one another.

This station 30 is arranged above the moonpool 3 so that the intermediate tubular assembly can be lowered during the assembly process into the moonpool and then further into the sea below the vessel.

The station 30 includes a clamp (not shown) for clamping the intermediate tubular assembly and supporting the weight thereof, e.g. comparable to a hang-off clamp in pipelaying systems.

In this example a supply device is provided allowing to supply said segments from a hold of the vessel to an assembly position vertically along the tower in the first firing line. Such a supply device can in general include equipment similar to piperacker equipment for holding and positioning the segment above the already prepared portion of the assembly 35.

The station 30 further includes an interconnection device of which the design depends from the design of the interconnection between the segments. If the segments are provided with screwthread couplings the station will allow for rotary drive of a new segment with respect to the segment or already assembled segments held by the clamp. Obviously, if welding is envisaged to interconnect the segments, the station 30 will include suitable welding means (and preferably line-up means to align the ends to be welded).

After the connection has been made the entirety of assembled segments, here called the intermediate tubular assembly 35, is lowered by means of the hoisting means including load connector 9 arranged at the entry side of the mast.

Preferably one or more intermediate tubular assemblies 35 are created each having a length of at least 100 meters.

Figure 2:
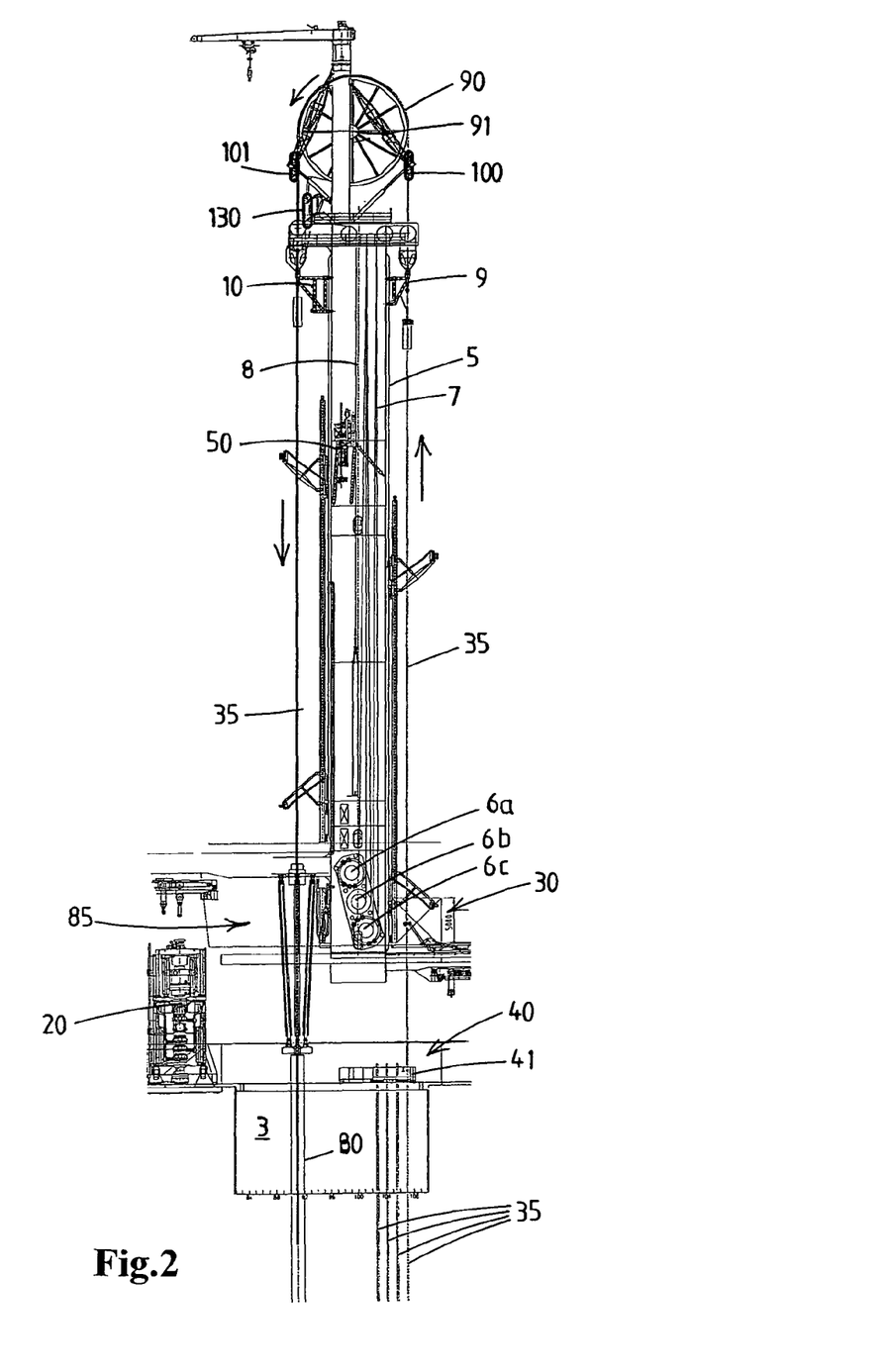
FIG. 2 shows on an enlarged scale the tower and guide structure of the vessel of FIG. 1.

As is shown in the FIGS. 1,2, below the station 30 a storage device 40 is arranged, here in the area of the moonpool 3. This device 40 is an intermediate tubular assembly suspension storage device 40 and is adapted for storage of one or more intermediate tubular assemblies 35, said intermediate tubular assemblies 35 being suspended from the vessel into the water by said storage device 40. The storage device 40 can include a movable cart 41 with support members for each assembly 35, allowing to position the cart 41 under the station 30 for reception of a new assembly 35.

In this example the cart 41 is movable in longitudinal direction of the vessel 1 as the support members are arranged in a row. In another embodiment the cart 41 could be embodied with support members in a 2-dimensional array, the latter preferably with the provision of a motion apparatus allowing displacement of the support members in two orthogonal directions.

It is noted that the cart 41 and associated support members could also be embodied to receive other tubulars used in conjunction with drilling operations e.g. a riser string and/or sections of a riser string.

In this example it is envisaged that the actual wellbore drilling takes place from the exit side of the mast 5. At this side the mast 5 is equipped with a topdrive 50 for the drillstring. Here the topdrive 50 is shown in stored position.

Also this exemplary vessel is equipped with a first and a second set-back 60, 65 which are placed beside the mast as can be seen in the plan views of FIG. 1. The set-backs 60, 65 serve for the accommodation of drill string elements, such as multi-joints. A first piperacker 61 is provided for moving said elements from the first set-back to the second firing line, or vice versa, and a second piperacker 66 is provided for moving said elements from the second set-back to said second firing line, or vice versa.

The vessel here also is equipped with coiled tubing drilling equipment 70 which will not be explained in more detail.

It is envisaged in this example that at least some of the drilling activities will be conducted in a manner wherein the drillstring rotates inside a riser 80, which is in general a pipe extending from the vessel to the BOP or "blowout preventer" unit on the seabed. The riser e.g. holds the displaced mud that is brought up to the surface from the drill hole. The mud is then cleaned and pumped back down again inside the drillstring. The mud is used to keep the hole open.

Riser segments are storage in storage 75 and be supplied to the exit side of the mast for assembly of the riser 80.

The vessel 1, as is preferred, here includes a riser suspension device 85 with heave compensation members for supporting the top end of the riser from the vessel.

It is preferred to embody cart 40 also with a support member for the riser 80, or for a portion of said riser 80. This allows temporary storage of the riser 80 out off the second firing line. In a non shown embodiment it can also be envisaged that the riser 80 or a portion thereof is assembled at station 30. In order to do so the cart 40 is preferably displaceable to a position under the exit side of the mast.

The mast 5 is part of what is mentioned here "a guide and handling system for intermediate tubular assemblies". The system is here understood to have an "entry" and an "exit", which in this example basically correspond to the hole in the work floor near the front or "entry" side of the mast and the hole in the work floor near the rear or "exit" side of the mast.

A further main component of said system, in the preferred embodiment of said system, is a curved guide structure for the assembly 35, which is in general terms located between said entry and said exit for guiding the intermediate tubular assembly through one or more curves.

The general arrangement, which can have a quite different design than depicted here, is that the entry being is arranged and adapted to receive a suspended intermediate tubular assembly 35 from the storage device 40. The system allows to feed the assembly upwards from the storage device 40, through the entry, towards a top of the system, and then downwards to the exit (here arranged at the other side of the mast). The system is further adapted for launching or lowering the intermediate tubular assembly 35 downward from said exit into the water towards and into the wellbore.

Figure 3:
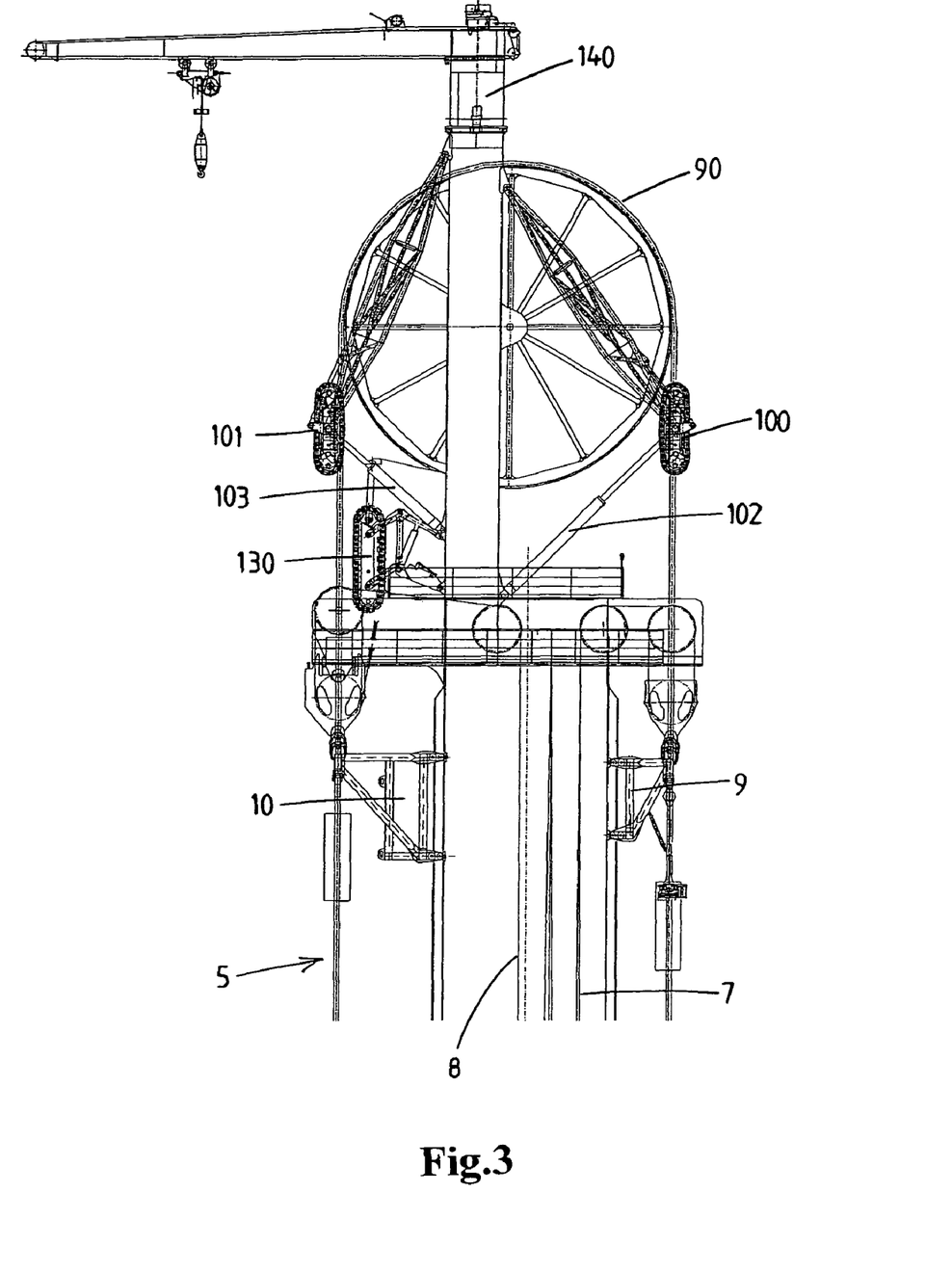
FIG. 3 shows on an even further enlarged scale the top portion of the tower and guide structure.

As is clear from the drawings, and as is preferred, the curved guide structure 90 here is mounted at the top end of the mast 5. This allows to feed the assembly upward along the entry side of the mast, then over the curved guide structure, and then down along the exit side of the mast 5.

As is preferred the curved guide structure here is a circular wheel 90, mounted on a horizontal axis 91. The wheel 90 preferably has at its circumference a groove for accommodation of the assembly, preferably the shape of the groove mating the diameter of the assembly 35. In a possible embodiment the wheel 90 includes multiple grooves of differing shape corresponding to frequently used diameters of such assemblies.

In another embodiment the curved guide structure is a semi-circular structure, e.g. including an endless belt supporting the assembly or a series of rollers.

The effect of this up and down path is that the trailing end of the launched assembly 35 is accessible for interconnection to another assembly 35 at a position above the waterline.

It is envisaged that when completing an expandable tubular from several assemblies 35 the first assembly 35—while held in the storage device or still in the station 30—is connected at its top end to a cable which is passed over the wheel 90 and then down along the exit side of the mast 5 to a winch. This allows to pull the assembly upwards, over the wheel 90, and then down to the exit.

In order to control the passage of the assembly 35 through the system of the vessel some sort of controlled drive means engaging on the assembly 35 are provided, as is preferred. Such drive means can also be required to provide a downward force in situations (such as the start-up) wherein the weight distribution (the weight of the assembly 35 on the exit side compared to the weight on the entry side) is such that some downward force is needed to launch the assembly appropriately.

In this example, as is preferred, the controlled drive means are formed by the first and second hoisting means on the mast, which serve multiple purposes. It is envisaged that the load connector of each hoisting means is embodied as a clamp engaging on the assembly, the clamp being actuable between a clamping and release mode. At the entry side of the mast the clamp can engage on the assembly in a lower clamp position and the be lifted with the associated winch, thereby lifting the assembly 35. On the exit side, especially when the weight of the tubular launched at said side is significant, the clamp will be primarily used to effect a controlled lowering of the assembly (by engaging on the assembly 35 at a raised position and then being lowered in a controlled manner by the winch while supporting (at least a portion of) the weight of the launched tubular). Suitable operation and actuation of said clamps allows to control the motion of the assembly at all times, e.g.; stopping when a new connection with a further intermediate assembly 35 has to be made.

The drawings further show to track units 100, 101 arranged near the wheel 90 and each having an endless track engaging on the assembly 35. These units 100, 101 here are each mounted on a mobile arm with an associated actuator (here hydraulic ram 102,103), allowing to press the tracks against the assembly 35 with a controlled force. The track unit could be motorized such that they for part of the controlled drive means for the assembly 35.

When the trailing end of the first assembly 35 reaches the station 30, a second assembly 35 is lifted from the storage cart 40 so that its upper end can be connected to said trailing end (e.g. by welding or otherwise). Then the interconnected assemblies 35 are brought in motion again (using hoisting means and possibly units 100,101) and at the exit the assembly is launched (here through the riser 80 which protects the tubular assembly). This operation can be continued until the expandable tubular has reached its desired position in the wellbore.

Then the expansion operation can be performed using suitable expansion tooling as is known in the art.

The wheel 90 preferably has a diameter between 10 and 20 meters. Large diameters obviously lead to reduced strain in the assembly during passage of the wheel 90 but have the drawback of being to heavy and susceptible to wind at said location high above deck of the vessel.

In order to keep the diameter of the wheel (of the radius of any other design of curved guide structure) practical, it is preferred to allow for plastic deformation of the assembly 35 as it passes over the wheel 90. This plastic deformation obviously causes the assembly to be "not straight anymore when leaving the wheel 90". As is preferred the vessel 1 includes, adjacent the wheel 90 on the exit side thereof, a straightener arrangement. Here a straightener track 130 is mounted opposite from the drive unit and downstream thereof to obtain a three-point straightening mechanism as is well known from the field of pipelaying.

Figure 4:
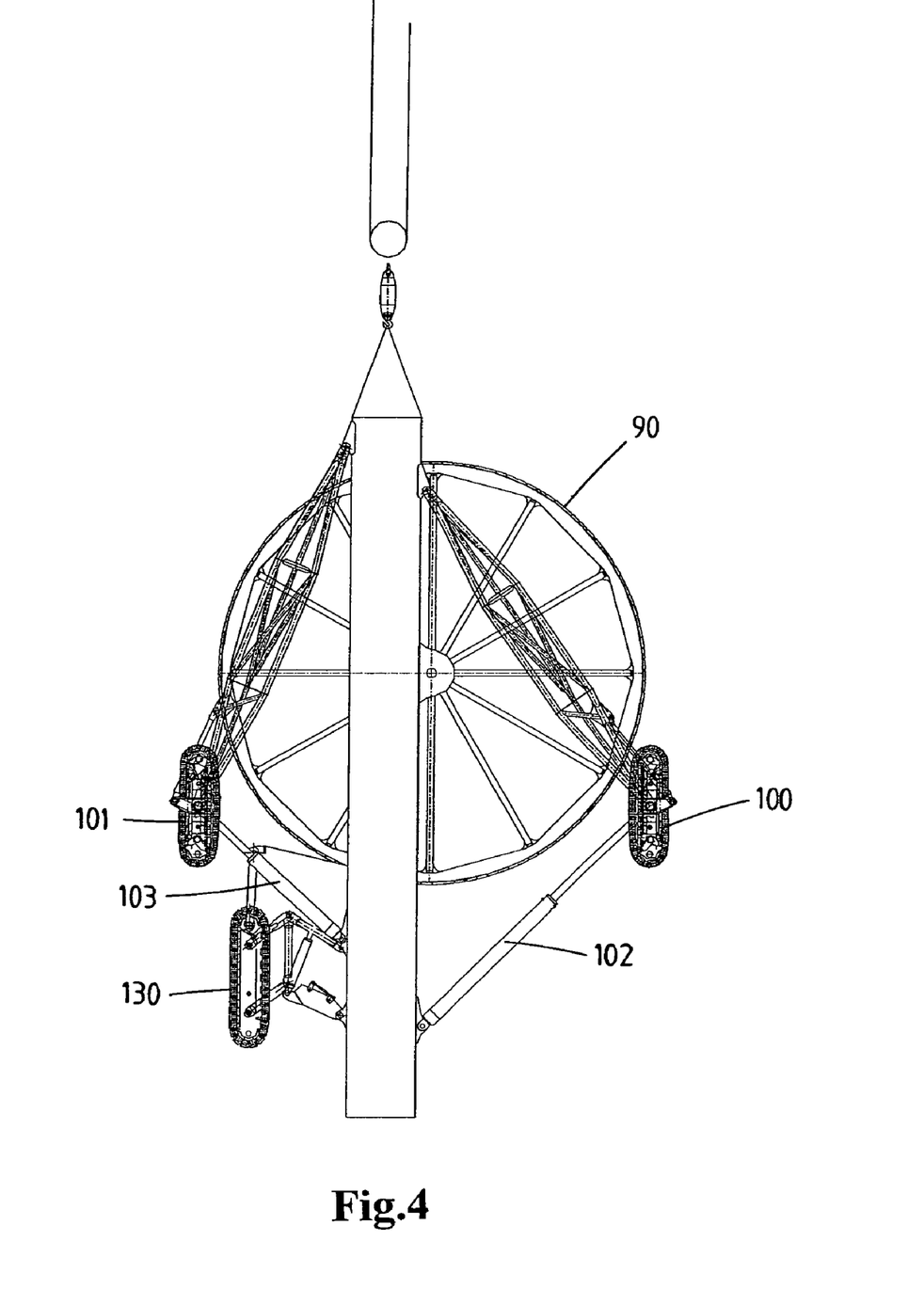
FIG. 4 shows the lowering of the curved guide structure.

FIG. 4 illustrates that the curved guide structure, here the wheel 90, is detachable from the mast 5 so as to allow fro removal of the curved guide structure when not in use. In this example a crane is mounted on top of the mast 5 allowing to lower and lift said curved guide structure.

Preferably the mast is provided with a moveable work platform in order to allow the crew to work safely at elevated heights.

The skilled person will appreciate that the "foot print" of the system for handling and guiding the expandable tubular assemblies as well as of their vertical storage is far smaller than any suitable reel for storage of such expandable tubulars.

The control of the passage of the tubular assembly through the system, and thus towards and into the wellbore can also be effected by means of tensioners as they are known from the field of pipelaying, e.g. including multiple driven tracks engaging on the assembly. Such tensioners are however bulky and heavy and thus would be problematic on the drilling vessel.

As mentioned in the introduction instead of the mast depicted here, the tower could be embodied as a derrick placed over the moonpool, or possibly two distinct moonpools. This e.g. applies to existing dual activity drilling vessel which can be converted for operation as disclosed herein.

The invention claimed is:

1. A method for installing an expandable tubular in a subsea wellbore, wherein said expandable tubular is assembled from expandable tubular segments, said expandable tubular being adapted to be expanded diametrically when positioned in said wellbore by means of expansion tooling, wherein a multitude of expandable tubular segments are provided, and wherein use is made of a surface vessel, said vessel comprising:

at least one assembly station adapted for the assembly of at least one intermediate tubular assembly by interconnection of multiple expandable tubular segments, an intermediate tubular assembly suspension storage device adapted for storage of one or more intermediate tubular assemblies, said intermediate tubular assemblies being suspended from the vessel into the water by said storage device, a guide and handling system for intermediate tubular assemblies, said guide and handling system having an entry and an exit, said entry being spaced from said exit, the entry being arranged and adapted to receive a suspended intermediate tubular assembly from the storage device, the system being adapted for the upward feeding of said intermediate tubular assembly from the entry towards a top of the system, and then downwards to the exit, said system further being adapted for launching the intermediate tubular assembly downward from said exit into the water towards and into the wellbore, wherein the guide and handling system comprises a curved guide structure between said entry and said exit for guiding the intermediate tubular assembly through one or more curves, causing plastic deformation of the intermediate tubular assembly when going through the curved guide structure causing plastic deformation of the intermediate tubular assembly when passing along the curved guide structure, a connecting station adapted for connecting an intermediate tubular assembly to another intermediate tubular assembly, and a straightener arrangement for straightening a plastically deformed intermediate tubular assembly.

2. The method according to claim 1, wherein the curved guide structure forms a semi-circular curved path at the top of the system.

3. The method according to claim 1, wherein the curved guide structure is a circular guide wheel.

4. The method according to claim 1, wherein the surface vessel includes a tower extending upwards from the vessel, the curved guide structure being arranged in an elevated position, preferably the top end, of the tower.

5. The method according to claim 4, wherein the tower is a mast.

6. The method according to claim 4, wherein the curved guide structure is detachable from the tower so as to allow removal of the guide structure when not in use.

7. The method according to claim 1, wherein the curved guide structure causes plastic deformation of the intermediate tubular assembly when passing along the curved guide structure, and wherein the straightener arrangement comprises a straightening device provided between the curved guide structure and the exit.

8. The method according to claim 1, wherein the curved guide structure has a radius between 5 and 10 meters.

9. The method according to claim 1, wherein the vessel further comprises at least one drilling station for effecting drilling of the wellbore.

10. The method according to claim 1, wherein the vessel includes coiled tubing drilling equipment.

11. The method according to claim 4, wherein the tower is provided at the side of the entry and exit with vertical displaceable trolleys.

12. The method according to claim 4, wherein the tower is provided with first hoisting means in a first firing line extending along the entry side of the tower, for manipulating a first object in the longitudinal direction of the tower, and with second hoisting means in a second firing line extending along the exit side of the tower, for manipulating the position of a second object in the longitudinal direction of the tower.

13. The method according to claim 4, wherein the tower is a mast having the form of a hollow elongated box structure, and wherein preferably one or more winches and cables are accommodated in said mast.

14. The method according to claim 4, wherein the mast is of a substantially quadrangular design.

15. The method according to claim 1, wherein at least a first and a second set-back are placed beside the tower, for the accommodation of drillstring elements, such as multi-joints, at least a first piperacker being provided beside the tower, for moving said elements from the first set-back to a firing line, or vice versa, and a second piperacker being provided, for moving said elements from the second set-back to said firing line, or vice versa.

16. The method according to claim 1, wherein the vessel is a mono-hull vessel.

17. The method according to claim 1, wherein the vessel includes a moonpool and wherein the tower is positioned above the moonpool.

18. The method according to claim 1, wherein the vessel includes at least one drilling station and wherein the vessel includes storage and handling means for a BOP.

19. The method according to claim 18, wherein said storage and handling means include a displaceable carrier for the BOP, which allow to align said BOP with a firing line and wherein associated hoisting means allow to lower of the BOP onto the seabed.

20. A vessel for installation of an expandable tubular in a subsea wellbore according to claim 1.

21. A vessel for installation of an expandable tubular in a subsea wellbore, wherein said expandable tubular is assembled from expandable tubular segments, said expandable tubular being adapted to be expanded diametrically when positioned in said wellbore by means of expansion tooling, wherein the vessel comprises:
   a storage for a multitude of expandable tubular segments,
   at least one assembly station adapted for the assembly of at least one intermediate tubular assembly by interconnection of multiple expandable tubular segments,
   an intermediate tubular assembly suspension storage device adapted for storage of one or more intermediate tubular assemblies, said intermediate tubular assemblies being suspended from the vessel into the water by said storage device,
   a guide and handling system for intermediate tubular assemblies, said guide and handling system having an entry and an exit, said entry being spaced from said exit, the entry being arranged and adapted to receive a suspended intermediate tubular assembly from the storage device, the system being adapted for the upward feeding of said intermediate tubular assembly from the entry towards a top of the system, and then downwards to the exit, said system further being adapted for launching the intermediate tubular assembly downward from said exit into the water towards and into the wellbore, wherein the guide and handling system comprises a curved guide structure between said entry and said exit for guiding the intermediate tubular assembly through one or more curves, causing plastic deformation of the intermediate tubular assembly when going through the curved guide structure, causing plastic deformation of the intermediate tubular assembly when passing along the curved guide structure,
   a connecting station adapted for connecting an intermediate tubular assembly to another intermediate tubular assembly, and
   a straightener arrangement for straightening a plastically deformed intermediate tubular assembly.

* * * * *